United States Patent
Fan

(10) Patent No.: US 8,967,013 B2
(45) Date of Patent: Mar. 3, 2015

(54) OPTIMIZATION OF FACE CONE ELEMENT FOR SPIRAL BEVEL AND HYPOID GEARS

(75) Inventor: Qi Fan, Rochester, NY (US)

(73) Assignee: The Gleason Works, Rochester, NY (US)

(*) Notice: Subject to any disclaimer, the term of this patent is extended or adjusted under 35 U.S.C. 154(b) by 417 days.

(21) Appl. No.: 13/559,653

(22) Filed: Jul. 27, 2012

(65) Prior Publication Data

US 2013/0025394 A1     Jan. 31, 2013

Related U.S. Application Data

(60) Provisional application No. 61/512,986, filed on Jul. 29, 2011.

(51) Int. Cl.
| | | |
|---|---|---|
| F16H 1/14 | (2006.01) | |
| B23F 15/00 | (2006.01) | |
| B23F 17/00 | (2006.01) | |
| F16H 55/08 | (2006.01) | |
| B23F 19/00 | (2006.01) | |

(52) U.S. Cl.
CPC ............ *B23F 17/001* (2013.01); *F16H 55/088* (2013.01); *B23F 17/005* (2013.01); *B23F 19/002* (2013.01)
USPC .................. 74/457; 74/459.5; 409/26; 409/28

(58) Field of Classification Search
CPC .... F16H 55/088; B23F 17/001; B23F 19/002; B23F 17/005
USPC ............. 74/457, 459.5, 460, 462; 409/26, 28, 409/38, 39
See application file for complete search history.

(56) References Cited

U.S. PATENT DOCUMENTS

| | | | |
|---|---|---|---|
| 1,390,414 A |   | 9/1921 | Wingqvist |
| 3,533,300 A | * | 10/1970 | Studer ............................ 74/462 |
| 3,605,518 A | * | 9/1971 | Haller ......................... 74/459.5 |
| 4,308,760 A |   | 1/1982 | Voigtländer et al. |
| 4,981,402 A |   | 1/1991 | Krenzer et al. |
| 5,088,243 A | * | 2/1992 | Krenzer ......................... 451/47 |
| 5,528,952 A | * | 6/1996 | Takita et al. ................. 74/459.5 |
| 5,546,824 A | * | 8/1996 | Miller et al. ................ 74/421 R |
| 5,580,298 A |   | 12/1996 | Stadtfeld |
| 5,716,174 A | * | 2/1998 | Stadtfeld et al. ............... 409/26 |
| 5,800,103 A | * | 9/1998 | Stadtfeld et al. ............... 409/27 |
| 6,178,840 B1 |   | 1/2001 | Colbourne et al. |
| 6,390,893 B1 | * | 5/2002 | Stadtfeld et al. ............... 451/47 |
| 6,669,415 B2 |   | 12/2003 | Stadtfeld et al. |
| 6,712,566 B2 |   | 3/2004 | Stadtfeld et al. |

(Continued)

FOREIGN PATENT DOCUMENTS

GB          254884 A          7/1926

OTHER PUBLICATIONS

International Search Report and Written Opinion for corresponding PCT application, PCT/US2012/048445.

*Primary Examiner* — David M Fenstermacher
(74) *Attorney, Agent, or Firm* — Robert L. McDowell

(57) ABSTRACT

A method of determining an optimized face cone element for spiral bevel and hypoid gears. The form of the root fillet of one member of a gear pair is determined and that from is transferred to the tip of the other member of the gear pair. With the inventive method, tooth root-tip clearance is optimized and the contact ratio is maximized while avoiding root-tip interference between mating gear members.

13 Claims, 10 Drawing Sheets

(56) References Cited

U.S. PATENT DOCUMENTS

| | | | | |
|---|---|---|---|---|
| 6,837,123 B2 | * | 1/2005 | Hawkins | 74/457 |
| 6,964,210 B2 | * | 11/2005 | Colbourne | 74/462 |
| 7,077,026 B2 | * | 7/2006 | Colbourne | 74/457 |
| 7,462,092 B2 | * | 12/2008 | Stadtfeld et al. | 451/11 |
| 7,627,390 B2 | * | 12/2009 | Mueller et al. | 700/97 |
| 7,827,879 B2 | * | 11/2010 | Hoshino et al. | 74/459.5 |
| 7,849,758 B2 | * | 12/2010 | Katz | 74/462 |
| 7,927,048 B2 | * | 4/2011 | Gumpl et al. | 409/26 |
| 7,950,305 B2 | * | 5/2011 | Gutmann et al. | 74/457 |
| 7,974,730 B2 | * | 7/2011 | Durr | 700/164 |
| 8,006,385 B2 | * | 8/2011 | Mataga | 29/893.3 |
| 8,020,464 B2 | * | 9/2011 | Jiang et al. | 74/462 |
| 8,100,028 B2 | * | 1/2012 | Miyaoku et al. | 74/462 |
| 8,573,087 B2 | * | 11/2013 | Stadtfeld | 74/416 |
| 8,660,684 B2 | * | 2/2014 | Mundt et al. | 700/173 |
| 8,747,035 B2 | * | 6/2014 | Engemann | 409/26 |

* cited by examiner

OPTIMIZATION OF FACE CONE ELEMENT FOR SPIRAL BEVEL AND HYPOID GEARS

This application claims the benefit of U.S. Provisional Patent Application No. 61/512,986 filed Jul. 29, 2011 the entire disclosure of which is hereby incorporated by reference.

FIELD OF THE INVENTION

The present invention is directed to spiral bevel and hypoid gears and in particular, to the optimization of the face cone element of spiral bevel and hypoid gears.

BACKGROUND OF THE INVENTION

In the production of gears, especially bevel gears, two types of processes are commonly employed, generating processes and non-generating processes.

Generating processes can be divided into two categories, face milling (intermittent indexing) and face hobbing (continuous indexing). In generating face milling processes, a rotating tool is fed into the workpiece to a predetermined depth. Once this depth is reached, the tool and workpiece are then rolled together in a predetermined relative rolling motion, known as the generating roll, as though the workpiece were rotating in mesh with a theoretical generating gear, the teeth of the theoretical generating gear being represented by the stock removing surfaces of the tool. The profile shape of the tooth is formed by relative motion of the tool and workpiece during the generating roll.

In generating face hobbing processes, the tool and workpiece rotate in a timed relationship and the tool is fed to depth thereby forming all tooth slots in a single plunge of the tool. After full depth is reached, the generating roll is commenced.

Non-generating processes, either intermittent indexing or continuous indexing, are those in which the profile shape of a tooth on a workpiece is produced directly from the profile shape on the tool. The tool is fed into the workpiece and the profile shape on the tool is imparted to the workpiece. While no generating roll is employed, the concept of a theoretical generating gear in the form of a theoretical "crown gear" is applicable in non-generating processes. The crown gear is that theoretical gear whose tooth surfaces are complementary with the tooth surfaces of the workpiece in non-generating processes. Therefore, the cutting blades on the tool represent the teeth of the theoretical crown gear when forming the tooth surfaces on the non-generated workpiece.

The relationship between the workpiece and generating gear can be defined by a group of parameters known as basic machine settings. These basic settings communicate a sense of size and proportion regarding the generating gear and the workpiece and provide a common starting point for gear design thus unifying design procedures among many models of machines. The basic settings totally describe the relative positioning between the tool and workpiece at any instant.

Basic machine settings for forming gears are known in the art and may be defined as follows:
1. cradle angle (q) which defines the angular position of the tool about the cradle axis;
2. radial setting (S) which is the distance between the cradle axis and the tool axis;
3. swivel angle (j) which defines the orientation of the tool axis relative to a fixed reference on the cradle;
4. tilt angle (i) which defines the angle between the cradle axis and the tool axis;
5. root angle ($\gamma_m$) which sets forth the orientation of the work support relative to the cradle axis;
6. center-to-back or head setting ($X_p$) which is a distance along the work axis from the apparent intersection of the work and cradle axes to a point located a fixed distance from the workpiece;
7. work offset ($E_m$) which defines the distance between the work axis and the cradle axis;
8. sliding base ($X_b$) which is the distance from the machine center to the apparent intersection of the work and cradle axes;
9. rotational position of the workpiece ($\omega_w$);
10. rotational position of the tool ($\omega_t$), for face hobbing;
11. ratio-of-roll ($R_a$) between cradle rotation and workpiece rotation, for generating.

In conventional gear forming machines, the cradle angle, workpiece rotation and tool rotation change during generation while the other settings generally remain fixed. Two notable exceptions to this are helical motion which involves motion of the sliding base, $X_b$, and vertical motion which is motion on the work offset direction, $E_m$.

The conventional mechanical machine meets the concept of the theoretical basic machine since nearly all machine settings correspond to theoretical basic settings. Such a machine may be illustrated by FIG. 2. In the mechanical machine, the basic setting for the radial, S, is controlled by an angular machine setting known as the eccentric angle.

Generating and non-generating processes are usually carried out on conventional mechanical gear generating machines or on multi-axis computer controlled (e.g. CNC) gear generating machines (such machines also being known as "free-form" machines). Conventional mechanical gear generating machines for producing bevel gears comprise a work support mechanism and a cradle mechanism. During a generating process, the cradle carries a circular tool along a circular path about an axis known as the cradle axis. This is known as the generating roll or cradle roll. The cradle represents the body of the theoretical generating gear and the cradle axis corresponds to the axis of the theoretical generating gear. The tool represents one or more teeth on the generating gear. The work support orients a workpiece relative to the cradle and rotates it at a specified ratio to the cradle rotation. Traditionally, conventional mechanical cradle-style bevel gear generating machines are usually equipped with a series of linear and angular scales (i.e. settings) which assist the operator in accurately locating the various machine components in their proper positions.

In multi-axis computer controlled gear generating machines, such as those disclosed by U.S. Pat. Nos. 4,981,402; 6,669,415 and 6,712,566, the disclosures of which are hereby incorporated by reference, movement of a tool relative to a workpiece along or about multiple machine axes (e.g. 5 or 6) can perform the cycle of movements including the kinematical relationship of the work and tool in the manner the same (or nearly the same) as that performed to generate a bevel gear in a conventional machine process utilizing a known face mill cutter or grinding wheel.

It has generally become the practice in the art to utilize the same input parameters (e.g. machine settings) as a conventional mechanical cradle-style gear generating machine for multi-axis computer controlled gear generating machines having a different number and/or configuration of axes. In other words, the positions of the tool and workpiece axes in the coordinate system of a conventional mechanical cradle-style bevel gear generating machine are transformed into the alternative coordinate system of the multi-axis computer controlled gear generating machine. Examples of such transformations can be found in the above referenced U.S. Pat. Nos. 4,981,402; 6,669,415 and 6,712,566, the disclosures of which are hereby incorporated by reference.

In the design of blanks for spiral bevel and hypoid gears, the face cone is defined as an imaginary cone tangent to the tops of the teeth. Traditionally, the face cone element or generatrix is a straight line intersecting the face cone apex. On the other hand, the tooth root lines are traced by the blade tips and normally are curved lines due to the facts that (1) the teeth are generated by a tilted circular cutter head and (2) for bevel gears that are generated with higher order modifications, the root lines are generally higher-order curves. See FIG. 1(a). As a result, the tooth top geometry may not fit the mating member's real root shape, providing an uneven tooth root-tip clearance. Additionally, in some cases, root-tip interference such as corner or edge contact, may be observed. FIG. 1(b) illustrates an example of corner interference and edge contact on the gear root surfaces and the pinion tip where highly concentrated contact stress may be present.

To avoid the root-tip interference, it is known to shorten the pinion teeth, as shown in FIG. 1(c), which results in reduced working area of the tooth surfaces and the contact ratio. Alternatively, to avoid interference, it is disclosed in U.S. Pat. No. 4,308,760 that the top of a tooth be formed such that contact with the tooth root of a mating member is prevented. The form of a tooth top may match the form of the root portion of a mating gear member. It is also known from U.S. Pat. No. 1,390,414 to provide teeth that are convex-shaped (tooth tops and tooth roots) in the longitudinal direction in order to decrease contact bending stresses.

The present invention proposes a method to modify the form of the face cone element in order to make the tooth tip line of one member of a gear pair fit the corresponding tooth root line of the mating member of the gear pair.

SUMMARY OF THE INVENTION

The present invention is directed to a method of determining an optimized face cone element for spiral bevel and hypoid gears. The form of the root fillet of one member of a gear pair is determined and that form is transferred to the tip of the other member of the gear pair. With the inventive method, tooth root-tip clearance is optimized and the contact ratio is maximized, while avoiding root-tip interference between mating gear members.

The inventive method comprises producing a gear blank having an outer surface wherein a gear manufactured from the gear blank will have tooth tips that do not interfere with tooth root fillets of a mating gear when the gear and the mating gear are run in mesh. The method includes the steps of defining tooth surfaces of each of the gear and the mating gear and defining the form of a root fillet line of the mating gear. The method further includes identifying the location of contact interference between the root fillet of the mating gear and a tip line of the gear when the gear and mating gear are run in mesh, and determining a modified form of the tooth tips of the gear wherein the modified form matches the form of the root fillet line of the mating gear. The gear blank is then machined wherein the modified form of the tooth tips is machined into the outer surface of the gear blank. A gearset having a gear manufactured from a gear blank produced by the inventive method exhibits an increased tooth contact ratio when compared to a gearset having a gear manufactured from a gear blank not produced by the inventive method, and contact interference is avoided in a gearset having gear manufactured from a gear blank produced by the inventive method.

DETAILED DESCRIPTION OF THE PREFERRED EMBODIMENT

Figure 1A:
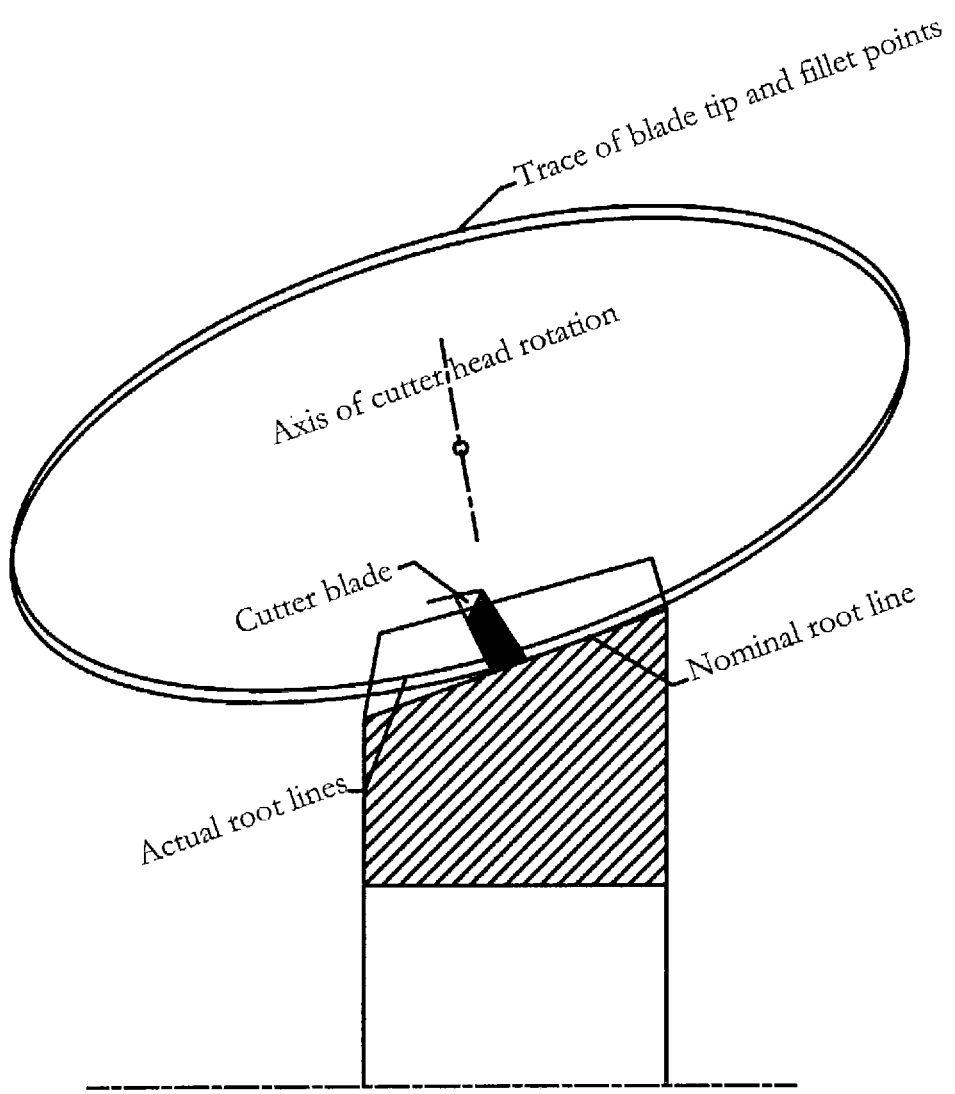
FIG. 1(a) shows the curved form of a root portion of a tooth due to the rotating circular cutter.
Figure 1B:
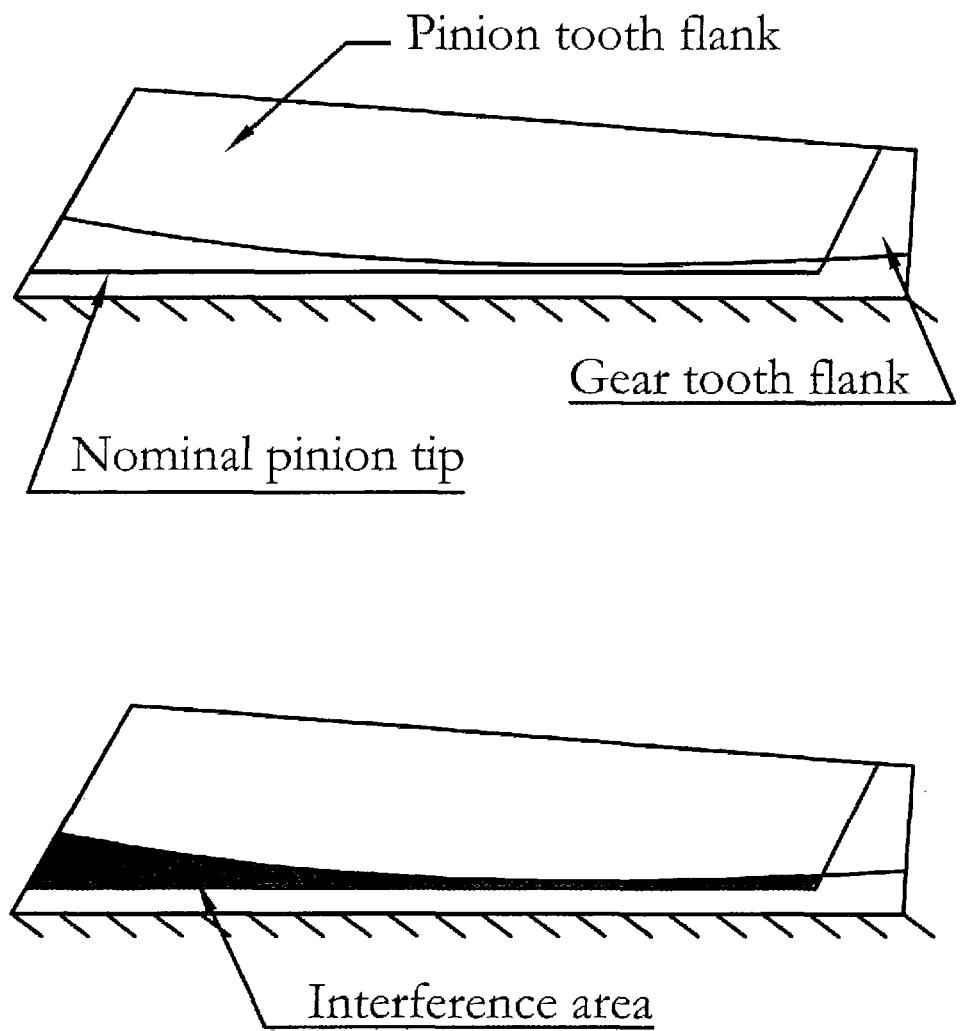
FIG. 1(b) illustrates an example of corner interference and edge contact on the gear root surfaces and the pinion tip.
Figure 1C:
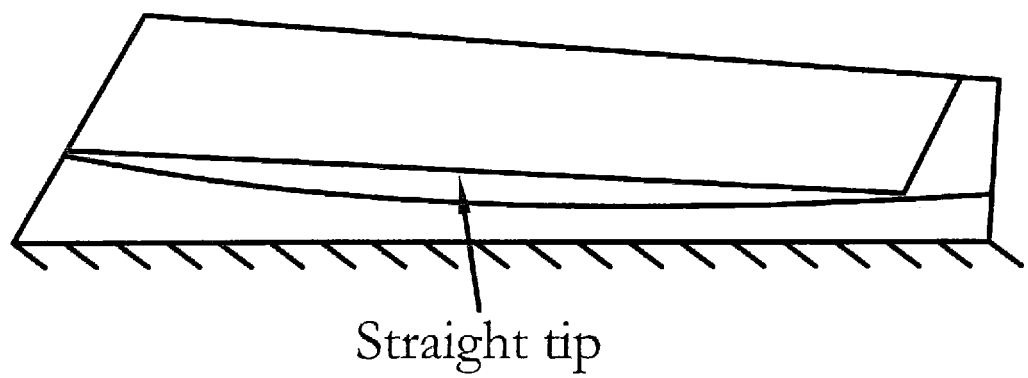
FIG. 1(c) displays an example of a tooth that has been shortened in order to avoid root-tip interference.

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

The terms "invention," "the invention," and "the present invention" used in this specification are intended to refer broadly to all of the subject matter of this specification and the patent claims below. Statements containing these terms should not be understood to limit the subject matter described herein or to limit the meaning or scope of any patent claim below. Furthermore, this specification does not seek to describe or limit the subject matter covered by the claims in any particular part, paragraph, statement or drawing of the application. The subject matter should be understood by reference to the entire specification, all drawings and claims below.

In the present inventive method, the tooth surface of the desired gear is defined preferably in terms of basic machine settings and cutting blade geometry as is known to the skilled artisan.

A universal generation model (UGM) is one means known for modeling of tooth surface geometries of both face-hobbed and face-milled spiral bevel and hypoid bevel gears. The UGM calculates the tooth surface coordinates using basic machine settings (FIG. 2) represented by polynomials, such as $6^{th}$-order polynomials as follows:

$$\begin{cases} R_a = R_{a0} + R_{a1}q + \ldots + R_{a4}q^4 + R_{a5}q^5 + R_{a6}q^6 \\ X_b = X_{b0} + X_{b1}q + \ldots + X_{b4}q^4 + X_{b5}q^5 + X_{b6}q^6 \\ s = s_0 + s_1 q + \ldots + s_4 q^4 + s_5 q^5 + s_4 q^6 \\ E_m = E_{m0} + E_{m1}q + \ldots + E_{m4}q^4 + E_{m5}q^5 + E_{m6}q^6 \\ X_p = X_{p0} + X_{p1}q + \ldots + X_{p4}q^4 + X_{p5}q^5 + X_{p6}q^6 \\ \gamma_m = \gamma_{m0} + \gamma_{m1}q + \ldots + \gamma_{m4}q^4 + \gamma_{m5}q^5 + \gamma_{m6}q^6 \\ j = j_0 + j_1 q + \ldots + j_4 q^4 + j_5 q^5 + j_6 q^6 \\ i = i_0 + i_1 q + \ldots + i_4 q^4 + i_5 q^5 + i_6 q^6 \end{cases} \quad (1)$$

where:
q=cradle rotational increment;
$R_a$=ratio of generating roll;
$X_b$=sliding base;
S=the cutter radial setting;
$E_m$=the offset;
$X_p$=the work head setting;
$\gamma_m$=the root angle;
j=the swivel angle;
i=the cutter head tilt angle.

Figure 2:
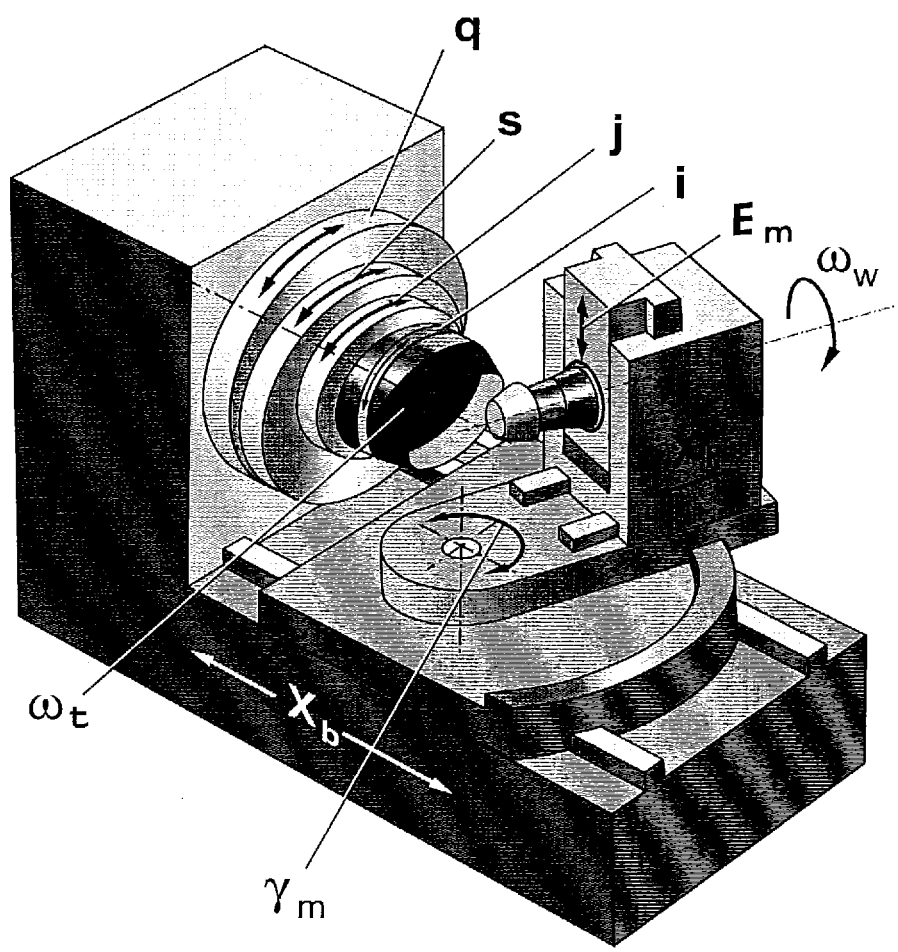
FIG. 2 illustrates a theoretical gear generating machine.

The machine settings represent corresponding kinematic elements of the theoretical hypoid bevel gear generating machine illustrated in FIG. 2. The above equations can be used to design higher-order modifications of tooth surfaces.

Figure 3:
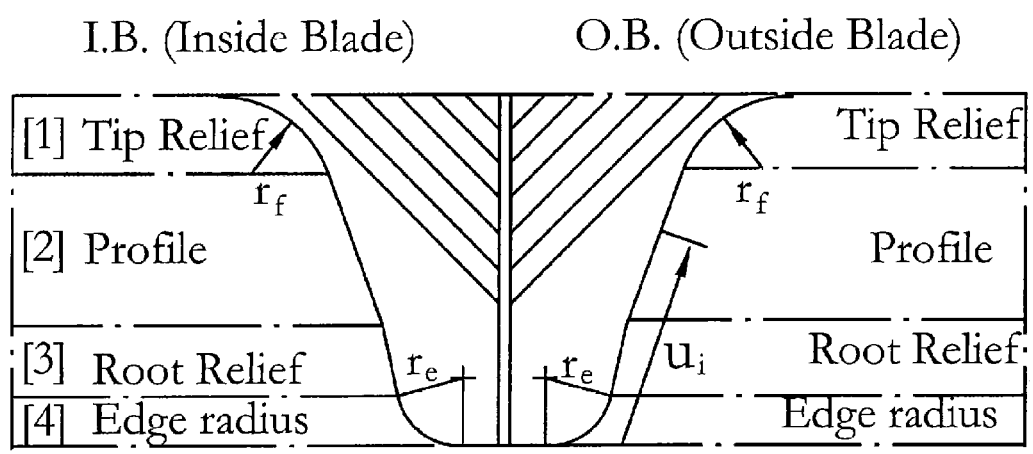
FIG. 3 illustrates a tool geometry consisting of four sections.

A tool geometry consisting of four sections, for example, is considered as shown in FIG. 3. Tool modifications with Tip Relief and Root Relief sections are incorporated. With the machine setting and cutting blade information, the cutting process may be mathematically modeled.

In order to define the surface of the teeth of the gear pair, one approach is to assign coordinate systems $S_1(x_1, y_1, z_1)$ and $S_2(x_2, y_2, z_2)$ that are respectively rigidly connected to the pinion and the gear. The tooth surface geometry of a pinion and a gear may be represented by a position vector, $r_1$, a unit normal vector, $n_1$, and a tangent vector, $t_1$, in a parametric form such as:

Pinion:

$$\begin{cases} r_1 = r_1(u_1, \theta_1, q_1) \\ n_1 = n_1(u_1, \theta_1, q_1) \\ t_1 = t_1(u_1, \theta_1, q_1) \\ f_1(u_1, \theta_1, q_1) = 0 \end{cases} \quad (2)$$

Generated Gear:

$$\begin{cases} r_2 = r_2(u_2, \theta_2, q_2) \\ n_2 = n_2(u_2, \theta_2, q_2) \\ t_2 = t_2(u_2, \theta_1, q_2) \\ f_2(u_2, \theta_2, q_2) = 0 \end{cases} \quad (3)$$

Non-Generated Gear:

$$\begin{cases} r_2 = r_2(u_2, \theta_2) \\ n_2 = n_2(u_2, \theta_2) \\ t_2 = t_2(u_2, \theta_2) \end{cases} \quad (4)$$

Figure 4:
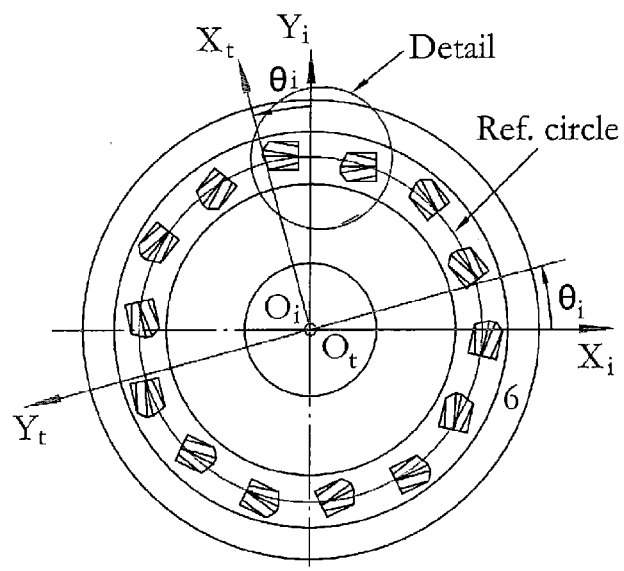
FIG. 4 illustrates cutter phase angle, $\theta_i$.

Here, and $u_i$ and $\theta_i$(i=1,2) are generating surface parameters (depth-of-cut and cutter phase angle, respectively) whose geometric meanings are shown in FIGS. 3 and 4 and $q_i$ (cradle or generating gear phase angle) is the parameter of the generating motion. And, $f(u_i,\theta_i,q_i)=0$ is the equation of meshing relating the three parameters for a generated pinion or gear. Theoretical tooth surfaces of the pinion and the gear can be numerically determined by Equations (2), (3) and (4).

Figure 5:
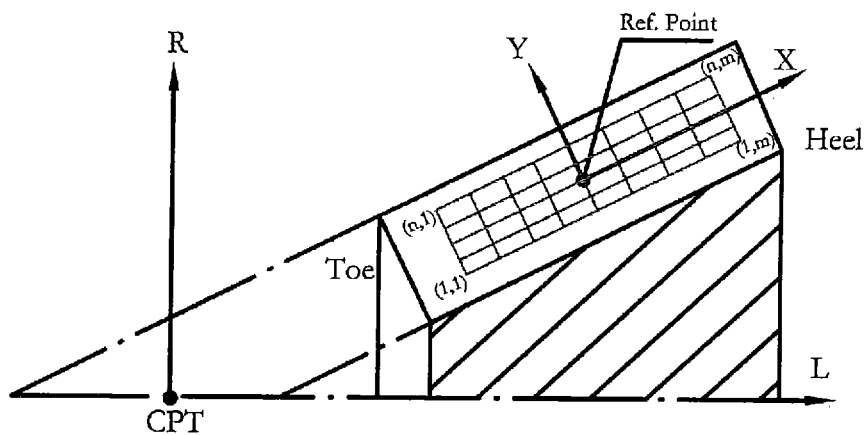
FIG. 5 shows tooth surface defined by a grid of n rows and m columns in the L-R axial plane of a bevel gear.

In order to numerically define a tooth surface, a grid of n rows and m columns is defined in the L-R axial plane of a bevel gear as shown in FIG. 5. Given a point by (L, R) the following system of nonlinear equations can be used to solve for the surface parameters $u_i$, $\theta_i$ and $q_i$, For a generated member:

$$\begin{cases} \sqrt{x_i^2(u_i, \theta_i, q_i) + y_i^2(u_i, \theta_i, q_i)} = R \\ z_i(u_i, \theta_i, q_i) = L \\ f_i(u_i, \theta_i, q_i) = 0 \end{cases} \quad (5)$$

For a non-generated gear:

$$\begin{cases} \sqrt{x_2^2(u_2, \theta_2) + y_2^2(u_2, \theta_2)} = R \\ z_2(u_2, \theta_2) = L \end{cases} \quad (6)$$

Figure 6:
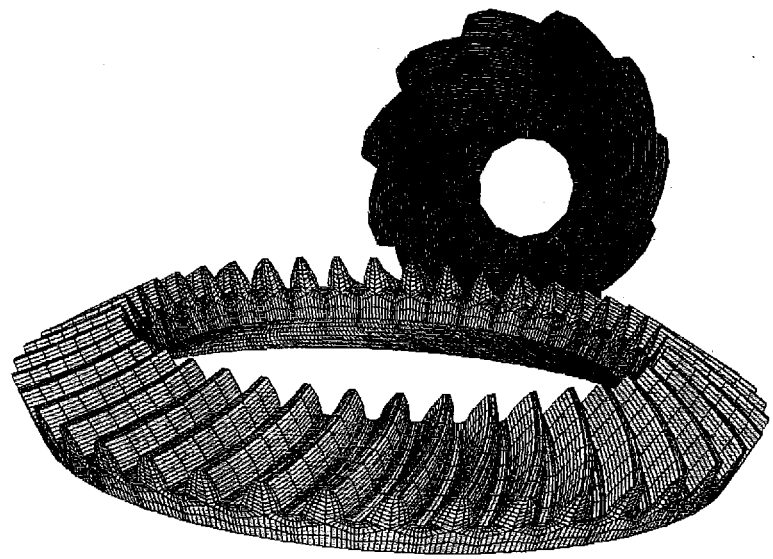
FIG. 6 illustrates an example of a hypoid gear finite element model which is generated using tooth surface grid points.

The coordinates of the position vector $r_i$, unit normal $n_i$, and tangent $t_i$, can then be determined using Equations (2), (3), and (4). Shown in FIG. 6 is an example of a hypoid gear finite element model which is generated using tooth surface grid points.

With the tooth surface of the gear and pinion members having been defined such as by the method discussed above, the location of interference between the gear and pinion teeth is identified. A preferred method to identify interference is by first determining the ease-off of the tooth surfaces.

The ease-off is defined as the normal difference between the real tooth surface and the conjugate tooth surface. For instance, when the gear tooth surface is considered as being generated by the pinion tooth surface under constant rolling condition defined by the numbers of teeth of the pinion and the gear, the gear ease-off can be defined as, $$\Delta r_2 = [r_2(u_2,\theta_2,q_2) - r_{2c}(u_1,\theta_1,q_1,\phi_1)] \cdot n_2(u_2,\theta_2,q_2) \quad (7)$$

where $\phi_1$ is the generating motion parameter of the pinion and $r_{2C}$ represents the conjugate gear surface that is generated by the pinion tooth surface and is determined as follows, $$\begin{cases} r_{2c} = M_{21}(\phi_1) r_1(u_1, \theta_1, q_1) \\ n_{2c} = L_{21}(\phi_1) n_1(u_1, \theta_1, q_1) \\ f_{1c}(u_1, \theta_1, q_1, \phi_1) = \dfrac{\partial r_{2c}}{\partial \phi_1} \cdot n_{2c} = 0 \\ f_1(u_1, \theta_1, q_1) = 0 \end{cases} \quad (8)$$

Figure 7:
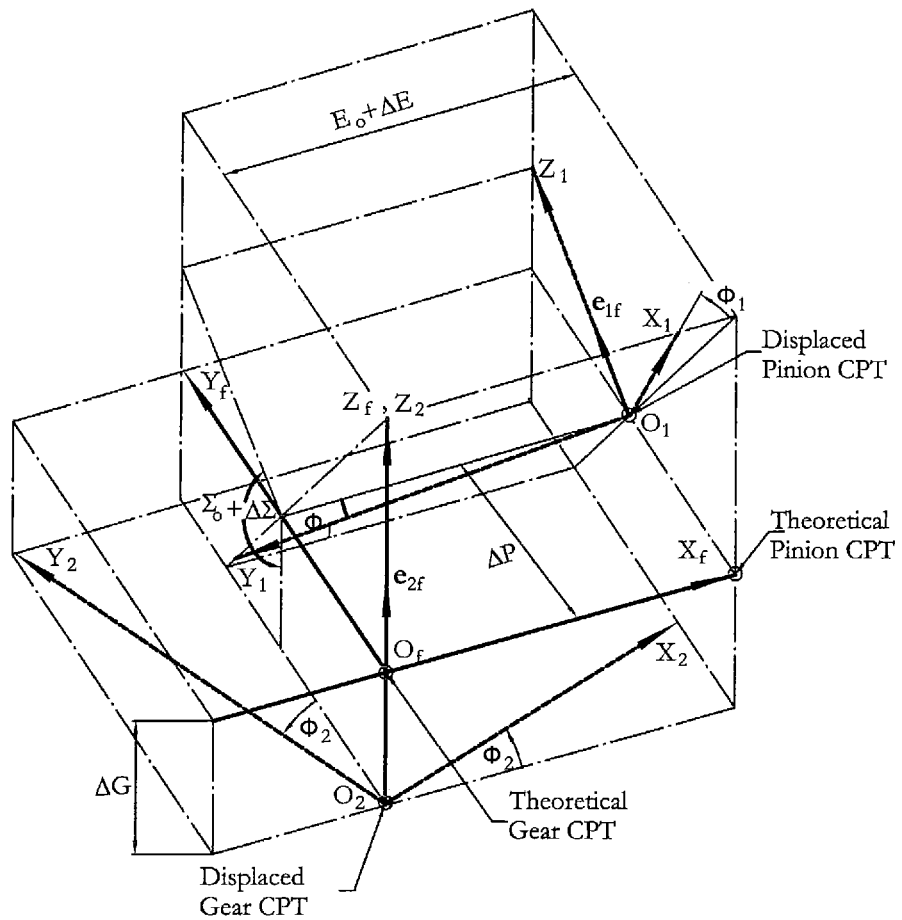
FIG. 7 illustrates the applied coordinate systems corresponding to the configuration of the hypoid gear model shown in FIG. 6.

Here, the pinion tooth surface is considered as the generating surface whose geometry is represented by the position vector $r_1$ and unit normal $n_1$. $f_{1c}(u_1,\theta_1,q_1,\phi_1)=0$ is the equation of meshing and $M_{21}$ and $L_{21}$ are the coordinate transformation matrices from system $S_1(x_1,y_1,z_1)$ to $S_2(x_2,y_2,z_2)$, representing pinion tooth surface in the coordinate system of the gear. FIG. 7 illustrates the applied coordinate systems corresponding to the configuration of the hypoid gear model shown in FIG. 6 and incorporating any misalignments of the gear drive.

Figure 8:
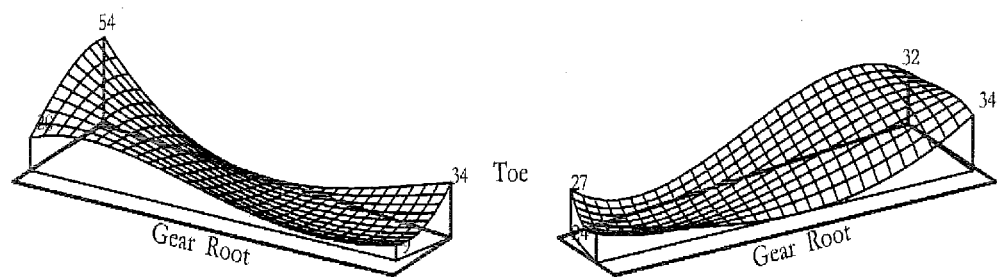
FIG. 8 displays an example of gear ease-off topographies corresponding to the gear convex and concave sides.

An example of gear ease-off topographies corresponding to the gear convex and concave sides is shown in FIG. 8 in which the ease-off grids are defined by the overlapped areas of the pinion and gear tooth surfaces generated with higher order motions defined by Equation (1).

In the same manner, the pinion ease-off can be defined as, $$\Delta r_1 = [r_1(u_1,\theta_1,q_1) - r_{1c}(u_2,\theta_2,q_2,\phi_1)] \cdot n_1(u_1,\theta_1,q_1) \quad (9)$$

Here, $r_{1c}$ represents the conjugate pinion surface that is generated by the gear tooth surface and is determined as follows, $$\begin{cases} r_{1c} = M_{12}(\phi_1) r_2(u_2, \theta_2, q_2) \\ n_{1c} = L_{12}(\phi_1) n_2(u_2, \theta_2, q_2) \\ f_{2c}(u_2, \theta_2, q_2, \phi_1) = \dfrac{\partial r_{1c}}{\partial \phi_1} \cdot n_{1c} = 0 \\ f_2(u_2, \theta_2, q_2) = 0 \end{cases} \quad (10)$$

It may be assumed that a generated gear is considered as the generating member. If the generating member is a non-generated gear, Equations (9) and (10) can be written as, $$\Delta r_1 = [r_1(u_1, \theta_1, q_1) - r_{1c}(u_2, \theta_2, \phi_1)] \cdot n_1(u_1, \theta_1, q_1) \quad (11)$$
and
$$\begin{cases} r_{1c} = M_{12}(\phi_1) r_2(u_2, \theta_2) \\ n_{1c} = L_{12}(\phi_1) n_2(u_2, \theta_2) \\ f_{2c}(u_2, \theta_2, \phi_1) = \dfrac{\partial r_{1c}}{\partial \phi_1} \cdot n_{1c} = 0 \end{cases} \quad (12)$$

$M_{12}$ and $L_{12}$ are the coordinate transformation matrices from system $S_2(x_2,y_2,z_2)$ to $S_1(x_1,y_1,z_1)$ shown in FIG. 7.

Ease-off topography is used to visualize mismatch of mating tooth surfaces and numerically identify the contact conditions. The effects of using tool Tip Relief and/or Root Relief on the tooth contact conditions and the application of geometric and kinematic flank form modifications or corrections to the tooth surfaces (such as, for example, flank form modifications or corrections defined in accordance with the Universal Motion Concept (UMC) as disclosed in U.S. Pat. No. 5,580,298, the disclosure of which is hereby incorporated by reference) can be visualized and numerically adjusted through the ease-off topography.

The face cone element (or tip lines) of a gear member is determined as a conjugate image of the mating member's root lines. The root lines include bottom line, fillet line and Tip Relief line, which can be numerically determined as discrete points on these lines using Equations (2), (3) and (4) in which the parameter $u_i(i=1,2)=0, u_f, u_T$ are given respectively. The subscript i=1,2 designates pinion and gear member respectively. The coordinates of vectors $r_i$, $n_i$, and $t_i$ corresponding to each discrete point on the root lines can be determined by solving the following nonlinear equations, For a generated member:

$$\begin{cases} z_i(\theta_i, q_i) = L \\ f_i(\theta_i, q_i) = 0 \end{cases} \quad (13)$$

For a non-generated gear:

$$z_i(\theta_i) = L \quad (14)$$

Using the conjugate relationship described by Equations (8), (10) and (12), the tooth root lines can be respectively projected to the mating members' coordinate systems as the conjugate lines which can be considered as the sought-for tip lines, or the face cone elements, of the pinion and the gear. The gear tip line can be represented as:

$$\begin{cases} r_{2tip} = M_{21}(\phi_1) r_{1root} \\ n_{2tip} = L_{21}(\phi_1) n_{1root} \\ f_{1c}(\phi_1) = 0 \end{cases} \quad (15)$$

The pinion tip lines can be represented as, $$\begin{cases} r_{1tip} = M_{12}(\phi_1) r_{2root} \\ n_{1tip} = L_{12}(\phi_1) n_{2root} \\ f_{2c}(\phi_1) = 0 \end{cases} \quad (16)$$

Figure 9:
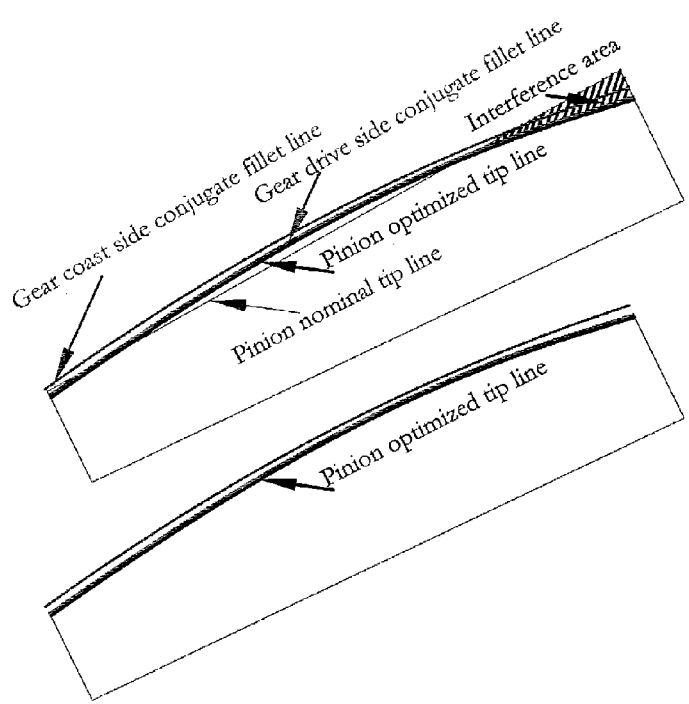
FIG. 9 represents the gear fillet lines of the convex and concave surfaces projected as conjugate lines on the pinion concave and convex surfaces and represented on the L-R coordinate system.

For example, the gear fillet lines of the convex and concave surfaces can be projected as conjugate lines on the pinion concave and convex surfaces and represented on the L-R coordinate system shown in FIG. 9.

The final optimized pinion tip line or pinion face cone element is determined by combining the two projected gear conjugate fillet lines and considering a given clearance above the conjugate fillet lines in order to eliminate interference on both sides.

As a confirmation of the optimized tooth tip line or face cone element, or as a means to predict tooth interference, a Tooth Contact Analysis (TCA) method employing potential contact lines may be utilized.

Figure 10:
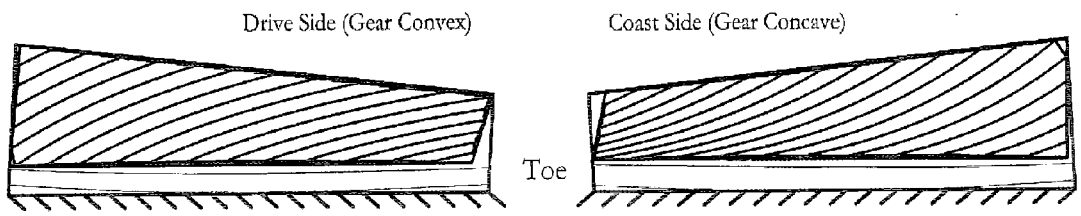
FIG. 10 shows the distribution of potential contact lines on gear convex and concave surfaces.

Potential contact lines are the family of instant contact lines represented on either gear or pinion tooth surfaces under the assumption that the applied load is heavy enough to close the gap along the tangent direction of the closest contact. The points on the potential contact lines can be determined using the conjugate relationship between the pinion and the gear tooth surfaces. For instance, points on potential contact lines on the gear tooth surfaces can be numerically determined using Equation (8) where parameters $\phi_1$ and $u_1$ are given as a series of discrete values that cover the whole tooth surface. Parameter $\phi_1$ defines the location of each potential contact line while parameter $u_1$ corresponds to each point on the potential contact line. FIG. 10 shows the distribution of potential contact lines on gear convex and concave surfaces. Given an instant pinion rotation angle $\phi_1$, the gear conjugate rotation angle is calculated as $\phi_2=\phi_1 z_1/z_2$, where $z_1$ and $z_2$ are the numbers of teeth of the pinion and the gear respectively. Each discrete value of parameter $\phi_1$ corresponds to a conjugate or potential contact line.

Using the concept of potential contact lines, an advanced version of tooth contact analysis (TCA) has been developed for modeling and simulation of meshing for both face-milled and face-hobbed spiral bevel and hypoid gear drives. The algorithm of TCA is based on the identification of the tooth surface gaps along the potential contact lines and is determined by Equation (7) or (9).

For a given position on the gear surfaces, the following TCA formulation can be used to solve for the tooth surface contact parameters:

For non-generated gear:

$$\begin{cases} r_{1f}(u_1, \theta_1, q_1) = r_{2f}(u_2, \theta_2) \\ f_1(u_1, \theta_1, q_1) = 0 \end{cases} \quad (17)$$

For generated gear:

$$\begin{cases} r_{1f}(u_1, \theta_1, q_1) = r_{2f}(u_2, \theta_2, q_2) \\ f_1(u_1, \theta_1, q_1) = 0 \\ f_2(u_2, \theta_2, q_2) = 0 \end{cases} \quad (18)$$

where $r_{1f}$ and $r_{2f}$ are position vectors of the pinion and gear tooth surface contact points and are represented in the coordinate system $S_f$ that is fixed to the frame.

The displacement parameters $\phi_1$ and $\phi_2$ are explicitly represented in terms of functions of the surface parameters as, $$\phi_1 = \phi_1(u_1, \theta_1, q_1, u_2, \theta_2, q_2) \quad (19)$$

$$\phi_2 = \phi_2(u_1, \theta_1, q_1, u_2, \theta_2, q_2) \quad (20)$$

which are derived from the contact condition of co-linearity of the normals at contact points. Specifically, $$\phi_1 = \sin^{-1}\left\{\frac{\cos\delta_1[e_{2f} \cdot e_{1f}(e_{1f} \cdot n_{1f}) - e_{2f} \cdot n_{2f}]}{(e_{1f} \times n_{1f})e_{2f}}\right\} - \delta_1 \quad (21)$$

$$\phi_2 = \sin^{-1}\left\{\frac{\cos\delta_2[e_{1f} \cdot e_{2f}(e_{2f} \cdot n_{2f}) - e_{1f} \cdot n_{1f}]}{(e_{2f} \times n_{2f})e_{1f}}\right\} - \delta_2. \quad (22)$$

Here, $$\delta_1 = \tan^{-1}\left\{\frac{[(n_{1f} \times e_{1f}) \times e_{1f}] \cdot e_{2f}}{(n_{1f} \times e_{1f}) \cdot e_{2f}}\right\} \quad (23)$$

$$\delta_2 = \tan^{-1}\left\{\frac{[(n_{2f} \times e_{2f}) \times e_{2f}] \cdot e_{1f}}{(n_{2f} \times e_{2f}) \cdot e_{1f}}\right\} \quad (24)$$

where $n_{1f}$ and $m_{2f}$ are unit normals of the pinion and gear tooth surface, which are calculated under $\phi_1=0$ and $\phi_2=0$ and $e_{1f}$ and $e_{2f}$ are unit vectors on the axes of the pinion and the gear shown in FIG. 7. Given a series of discrete values to parameter $q_1$ in the domain of pinion contact, Equations (17) to (22) can be solved, resulting in values of $\Delta E$, $\Delta P$, and $\Delta G$ corresponding to the given initial contact position.

The TCA includes the following features:
(1) TCA results for mean, toe, and heel standard positions with corresponding ease-off topographies are provided for visualization of relative tooth surface crowning;
(2) the UMC kinematical modifications of the tooth surfaces and tool modifications with Tip Relief and/or Root Relief are incorporated;
(3) the overlapped effective contact surfaces of mating tooth members are determined;
(4) root lines are calculated and shown in the TCA output for visualization of root-tip clearance;
(5) the TCA is able to identify possible tooth surface interference and calculates edge and corner contacts;
(6) real contact ratio is calculated under given maximum gap;
(7) TCA for given positions along gear lengthwise direction can be evaluated;
(8) simulation of misalignments $\Delta E$, $\Delta G$, $\Delta P$, and $\Delta \Sigma$ shown in FIG. 7 is considered;
(9) visualization of contact on the tooth surfaces of both members is provided;
(10) the TCA can be applied to both face-hobbed and face-milled spiral bevel and hypoid gears including bevel gears with a spiral angle of zero degrees and high-reduction hypoid gears.

The calculated tooth tip lines are verified by the TCA results of three standard contact positions to ensure that the interference is eliminated and a reasonable root-tip clearance is generated.

Figure 11:
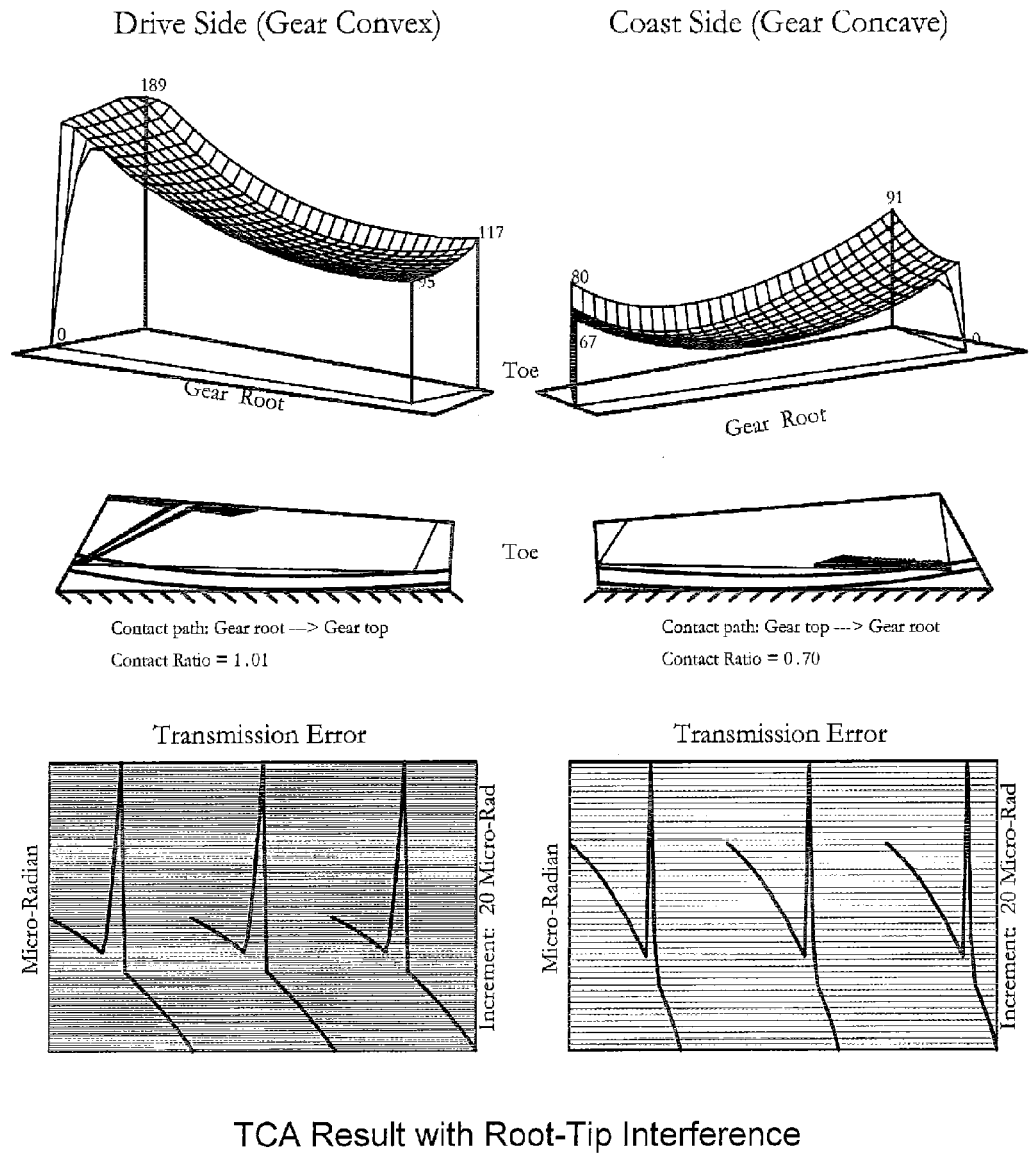
FIG. 11 illustrates an example of a face-milled hypoid gear design with root-tip interference as detected by Tooth Contact Analysis (TCA).
Figure 12:
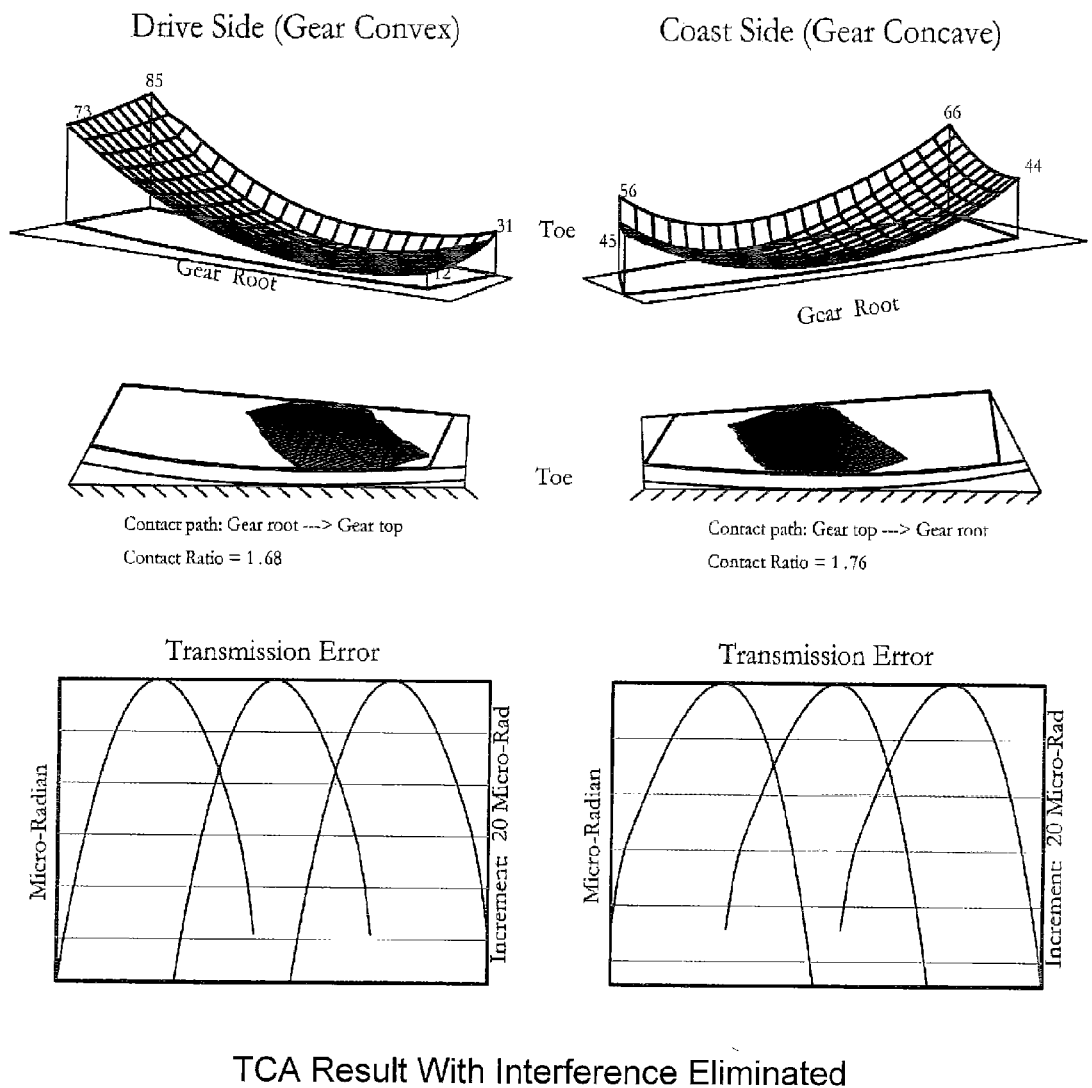
FIG. 12 shows an optimized curved pinion tip line determined and verified by TCA.

As an example, a face-milled hypoid gear design with root-tip interference is detected by TCA and shown in FIG. 11 which shows corner interference at heel on both drive and coast side. Design data and machine setting data of the example are given in Tables 1 and 2. The pinion tip line is then optimized to eliminate the interference and obtain an even root-tip clearance. A curved pinion tip line is determined and verified by the TCA illustrated in FIG. 12.

TABLE 1

Design Data (mm)

|  | Pinion (Left Hand) | Gear (Right Hand) |
| --- | --- | --- |
| Number of Teeth | 16 | 41 |
| Module |  | 3.95 |
| Face Width | 29 | 30 |
| Pinion Offset |  | 14 |
| Shaft Angle |  | 90° |
| Outer Cone Distance | 85.056 | 90.463 |
| Mean Cone Distance | 68.968 | 75.286 |
| Outside Diameter | 84.463 | 136.208 |
| Nominal Cutter Radius |  | 57.15 |
| Mean Spiral Angles | 42°1" | 31°6" |
| Pitch Angle | 26°4" | 63°31" |

TABLE 2

Machine Setting Parameters (mm)

|  | Pinion (Left Hand) | Gear (Right Hand) |
| --- | --- | --- |
| Ratio of roll | 2.511 |  |
| Root angle | −4°1" | 54°20" |
| Radial setting | 61.135 | 68.072 |
| Tilt angle | 26°3" |  |
| Swivel angle | −33°30" |  |
| MCTB ($X_b$) | 0.350 | 10.101 |
| Sliding base | 15.230 |  |
| Offset | 10.612 |  |
| Initial cradle angle | 61°10" | 57°20" |
| Cutter phase angle | 51°32" | 43°56" |

The calculated contact ratios are 1.01 and 0.70 for drive and coast side respectively with the existing interference, but they are 1.68 and 1.76 respectively after elimination of the interference and optimization of the pinion tip. The values of contact ratio can be visualized from the graphs of transmission errors shown in the TCA results. If the contact ratio is less than 1, jumping contact between adjacent teeth will occur and meshing impact will be generated. Since the area of active contact tooth surfaces are maximized in FIG. 12, consequently, the contact ratio is maximized.

With the present invention, tooth tip lines or the face cone elements of spiral bevel and hypoid gears are optimized in order to avoid root-tip interference, while maximizing the contact ratio. The approach is based on the conjugate relationship of the mating members. A curved face cone element is generally obtained for a bevel gear blank (ring gear and/or pinion blank) which can be manufactured by using CNC machines (e.g. turning machines, lathes, multi-axis machining centers, etc) as well as by powder metal or casting with molds based on the form of the optimized blank.

It is to be understood that the present invention equally applies to both members of a gear pair. Namely, optimizing pinion teeth tips to fit gear teeth roots as well as optimizing gear teeth tips to fit pinion teeth roots.

While the invention has been described with reference to preferred embodiments it is to be understood that the invention is not limited to the particulars thereof. The present invention is intended to include modifications which would be apparent to those skilled in the art to which the subject matter pertains.

What is claimed is:

1. A method of producing a gear blank having an outer surface wherein a gear manufactured from said gear blank will have tooth tip lines that do not interfere with tooth root fillets of a mating gear when said gear and said mating gear are run in mesh, said method comprising:
    defining tooth surfaces of each of the gear and the mating gear;
    defining the form of a root fillet line of the mating gear;
    identifying the location of contact interference between the root fillet of the mating gear and a tooth tip of the gear when the gear and mating gear are run in mesh;
    determining a modified form of the tooth tip line of the gear wherein said modified form matches the form of the root fillet line of the mating gear;
    machining said gear blank wherein the modified form of the tooth tip line is machined into the outer surface of the gear blank;
    wherein a gearset having a gear manufactured from a gear blank produced by said machining exhibits an increased tooth contact ratio when compared to a gearset having a gear manufactured from a gear blank not produced by said machining, and,
    wherein said contact interference is avoided in said gearset having a gear manufactured from a gear blank produced by said machining.

2. The method of claim 1 wherein the tooth surfaces are defined in terms of basic machine settings and cutting blade geometry.

3. The method of claim 2 wherein said basic machine settings represent kinematic elements of a theoretical bevel gear generating machine.

4. The method of claim 2 wherein said cutting blade geometry includes tip relief, profile, root relief and edge radius information for the cutting blade.

5. The method of claim 2 wherein the tooth surfaces are defined by a position vector, unit normal vector and tangent vector for each point in a tooth surface grid defined for the tooth surfaces.

6. The method of claim 1 wherein said contact interference is identified by determining ease-off of the tooth surfaces.

7. The method of claim 1 wherein the modified tip line of the gear is a conjugate image of the root fillet line of the mating gear.

8. The method of claim 7 wherein a predetermined amount of clearance is included between said modified tip line and said root fillet line so as to eliminate interference.

9. The method of claim 1 wherein said gear blank is a bevel pinion gear blank.

10. The method of claim 1 wherein said gear blank is a bevel ring gear blank.

11. The method of claim 1 wherein said method is carried out for each of a bevel pinion gear blank and a bevel ring gear blank and wherein said each of said blanks are subsequently manufactured to produce mating members of a gearset.

12. A gearset comprising a first gear and a second gear capable or rotating together in mesh,
    said first gear comprising a plurality of teeth with the teeth defining root fillet lines and tip lines;
    said second gear comprising a plurality of teeth with the teeth defining root fillet lines and tip lines;
    wherein in mesh, the tip lines of said first gear are conjugate images of the root fillet lines of said second gear and the tip lines of said second gear are conjugate images of the root fillet lines of said first gear.

13. The gearset of claim 12 wherein a predetermined amount of clearance is included between the tip lines and the root fillet lines of both first and second gears so as to eliminate interference.

* * * * *